Figure 1:
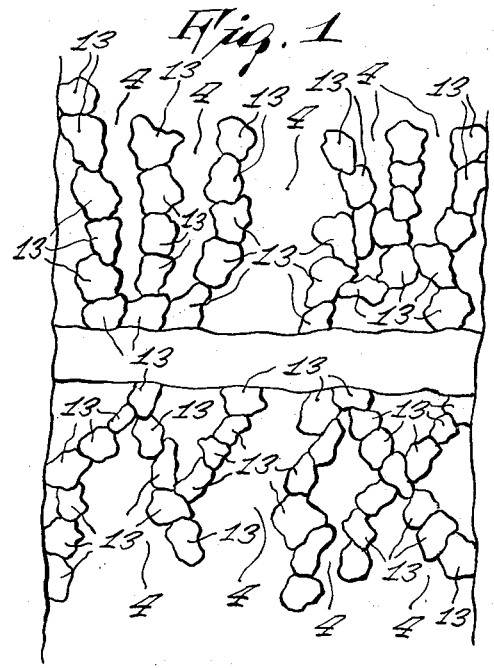

INVENTOR.
FREIMUT PETERS
BY Mestern & Kollin
ATTORNEYS

2,969,413
ALKALINE ACCUMULATORS

Freimut Peters, Hagen, Westphalia, Germany, assignor to Accumulatoren-Fabrik Aktiengesellschaft, Hagen, Westphalia, Germany Filed Sept. 24, 1958, Ser. No. 763,143

Claims priority, application Germany July 26, 1952

10 Claims. (Cl. 136—24)

This invention is a continuation-in-part of my co-pending application S.N. 370,225, filed July 24, 1953, now abandoned, and relates to alkaline accumulators, more particularly to porous metal sintered bodies or substances employed as mass carriers in alkaline accumulators. These sintered bodies are produced according to known proposals from nickel or copper or from a mixture of both metals. The invention specifically relates to sintered electrode plates composed of copper-nickel metal. Nickel-copper metal has been especially employed to a great extent as the starting material for porous electrode plates. It has been shown, however, that useful electrodes having good durability are only obtained under certain conditions.

Whereas nickel is passive in the caustic potash solution employed as an electrolyte, the copper becomes activated at a cell potential in relation to nickel hydrate of about 0.8 v., i.e. after the cadmium and/or iron employed as an active material of the negative electrode has discharged, in that copper becomes converted at deep discharge of the negative electrode into copper hydroxide which is noticeably soluble in the strong caustic potash, this being recognized by the appearance of a blue discoloration of the electrolyte. If in this operation the cell is discharged until reversal of polarity has substantially been attained, the copper becomes precipitated on the positive electrode which now has reversed polarity and, a negative potential, the copper again becoming dissolved in the electrolyte in the subsequent charging operation and being precipitated on the negative electrode.

Even with deep discharges which do not lead to reversal of polarity, the copper goes into solution and in the subsequent charging operation becomes precipitated on the negative electrode.

These copper precipitates, which particularly occur at zones of high current density, for example, at the apertures of perforated separators, finally lead to short circuits and consequently to cell deficiency. It has been ascertained that the copper action also unfavorably influences the capacity of the cell, in that this shows a recurrent action. These phenomena occur if copper-nickel powder mixtures are employed as starting materials in the usual manner.

The union of the two components is incomplete, as is ascertainable by miscroscopic examination, and more or less large copper clusters are residually present in the sintered plates. It is only after very long sintering times extending up to 20 hours and more, which, however, are not acceptable in practice, and which destroy the necessary highly porous sintered structure upon shrinkage, that complete homogenization, which is a valuable attainment, is achieved.

In contrast to the known processes of apparently similar nature (cf. U.S. 2,643,276), the process according to the present invention is based upon strictest maintenance of particle size of the reactants, i.e., copper and nickel, and without the application of pressure while forming a true alloy. The invention also is an improvement over known nickel-iron electrodes (cf. U.S. 2,700,062), because those alloys cannot be used for positive electrodes due to formation of iron hydroxide which is extremely harmful to the positive mass. When these nickel-iron alloys are employed as the negative mass, the iron dissolves in the electrolyte, wanders to the positive electrode and decreases the capacity of the storage battery considerably.

It has now been found that none of the above-described undesired phenomena occur if, according to the invention, homogeneous carrier plates are employed, i.e., plates composed of a copper-nickel alloy. The nickel constituent may comprise for example 30–50% or even more or less. Homogenization sufficient to remove the said disadvantages of former proposals is attained, and cells of good and durable capacity are obtained if, as a starting material for the sintered plates, a specially fine and pure copper powder is employed which, for example, has approximately 80 percent of a grain constituent of $d<0.06$ mm. in intimate mixture with a finely divided nickel powder, for example nickel carbonyl powder. The particularly fine copper powder preferably has a bulk weight of, for example, 0.5–1.5 g./cm.$^3$. By suitable choice of the sintering temperature and duration of sintering, substantial homogenization of the sintered plate is effected, this being recognizable by a nickel-like color.

A homogeneous sintered body is also obtained according to the invention if the copper-nickel powder is precipitated from a suitable composed electrolytic bath with the employment of copper and nickel anodes in suitable relation or of copper-nickel alloy anodes having for example 70–20% copper, this being obtained in ammoniacal or acid baths by appropriate composition of the bath, the pH value and electrolysis at certain current densities and temperatures and certain concentrations of the nickel and copper salts in the bath.

Furthermore, suitable copper-nickel powder may be produced by precipitation of copper or nickel from corresponding salt solutions by addition of base metals, for example zinc or nickel in the presence of nickel or copper powder, or by precipitating together copper and nickel powder. By proper selection of the conditions of precipitation, this process ensures that a product having the required properties with respect to grain size and density is obtained.

Moreover, a suitable starting material for copper-nickel sintered plates may be produced by a method in which copper or nickel hydroxides or other compounds are produced by chemical reactions in the presence of nickel or copper powder or nickel or copper compounds of suitable form, or in which copper-nickel compounds are produced together and are decomposed in a reducing atmosphere. The preferred conditions are a temperature of approximately 400° C. for 1–1.5 hours.

It is also possible to start with mixed copper-nickel compounds or with mixtures which are obtained, for example, from copper-nickel salt solutions by physical means, for example by concentration of the solvent by evaporation, reduction of solubility by introduction of additives, by precipitation as a result of exceeding the limit of solubility and which are then decomposed, preferably in a reducing atmosphere, into copper-nickel powder having the necessary quality.

In this case, starting solutions of copper-formate, -nitrate, -acetate, -chloride approximately of the same concentration and composition mentioned in connection with the foregoing examples are employed. The solutions, therefore, can be saturated with the above mentioned salts or may be more diluted solutions containing e.g. 5–10 g. of copper salt and 5–20 g. of nickel salt dissolved in a liter. The copper-nickel compounds precipitated from their solutions by chemical or physical means are then reduced to copper-nickel powder in a reducing atmosphere at temperatures of 300–400° C., the two components, copper and nickel, being present in the fine quality, purity and intimate mixture required according to the invention.

Furthermore, intimate mixtures of copper-nickel compounds can be obtained by mixing the pulverulent components in mixers of known commercial types. In this manner, mixtures of copper carbonate and nickel carbonate, of copper oxide and nickel oxide or of mixtures of other copper and nickel compounds which can be reduced by hydrogen, are produced. These mixtures having a grain constituent of approximately 70–90% with a diameter of <0.06 mm. are then converted to intimate, highly refined mixtures of copper and nickel metal in a reducing atmosphere at temperatures of 300–400° C.

Finally, it is also possible to decompose nickel carbonyl vapor in the presence of copper powder by heat, for instance at a temperature of approximately 200° C. In this case, the copper powder also has a grain constituent of approximately 70–90% with a diameter of <0.06 mm., thereby resulting in an intimate mixture of copper and nickel powder.

The methods for producing copper-nickel powder according to the invention may now be described by way of examples, but they are not limited to the details shown, since various modifications and changes may be made without departing in any way from the spirit of the present invention.

Copper powder may be produced electrolytically by precipitating it from a copper sulfate solution having a low copper sulfate concentration, for instance a copper sulfate bath containing 5–20 g. of dissolved anhydrous copper sulfate per liter, at a copper cathode, employing a current density of 2–10 a./dm.$^2$. After having been freed from copper sulfate by washing and subsequent drying, the fine copper powder is then intimately mixed mechanically with fine nickel powder in a mixer of a known type, said nickel powder having been obtained in a known large-scale process by decomposition of nickel carbonyl. The bulk weight of the nickel powder is not more than 1.5 g./cm.$^3$. Nickel powder of the fine quality required is commercially available. The copper-nickel powder obtained in the manner described is then sintered to form porous copper-nickel sintered bodies under known sintering conditions, i.e. in a reducing atmosphere at a temperature of 800–1000° C. for 0.5–2 hours.

A sintered body according to the invention, consisting of a copper-nickel alloy also is obtained when copper-nickel powder is precipitated from an electrolytical bath in the following manner: Using copper-nickel anodes or copper-nickel-alloy anodes with a proportion of 20–70% copper and 80–30% nickel, a copper-nickel powder is precipitated from an electrolytical bath containing 5–20 g. anhydrous copper sulfate and 15–30 g. anhydrous nickel sulfate dissolved in a liter, at copper cathodes, employing a current density of 2–10 a./dm.$^2$. The precipitation occurs when the pH value of the electrolytical bath is 3–4. The temperature of the bath should not exceed 60° C. However, it is possible to use ammoniacal baths for the electrolytical precipitation in which the copper-nickel is present in the form of complex salts containing ammonia. In that case the pH value is 10–14.

It is possible to obtain a suitable starting material for the sintered bodies according to the invention by so-called cementing of copper or nickel powder in the presence of nickel or copper powder, when in the process of cementation nickel powder is suspended in the copper sulfate solution and copper powder is suspended in the nickel solution. Here, too, copper or nickel solutions of a suitable concentration are used. The metal salt solutions used contain 5–10 g. anhydrous copper sulfate and 5–20 g. anhydrous nickel sulfate dissolved to a liter. The cementation is effected by adding a less noble metal, which, in the case of a copper salt solution can be zinc or nickel powder, and in the case of a nickel salt solution, zinc powder.

Furthermore, it is possible to obtain a suitable starting material for copper-nickel sintered bodies by producing copper or nickel hydroxide or other compounds of these metals by means of chemical processes, i.e. by precipitation from copper or nickel salt solutions, in the presence of nickel or copper powder or compounds, as for instance nickel or copper oxides, or producing copper-nickel compounds together, in the form of copper-nickel hydroxides by precipitation from copper-nickel salt solutions, and reducing them to copper-nickel metal in a reducing atmosphere at a low reaction temperature, i.e. a temperature of 300–400° C.

The precipitation of copper and nickel hydroxides may be effected, for instance, by means of sodium hydroxide from metal salt solutions of the same composition as in the previous examples at a temperature of 20–30° C. The concentration of the salt solutions from which the compounds are precipitated in a chemical manner is not of major importance. The concentration may be so high that the solutions to be precipitated are saturated with copper-nickel salts, for instance copper and nickel sulfate.

In the reduction process of the copper compounds mixed with nickel powder, of the nickel compounds mixed with copper powder or the copper compounds and nickel compounds precipitated together, a metal powder is obtained having the necessary physical and chemical qualities.

It is not permissible to form the metal powder by reduction of the products obtained in the manner mentioned, during the sintering process of the electrodes, because strong shrinking phenomena appear and extensively cracked and shrunken products are obtained which are not suitable for use as accumulator plates. Thus the reduction operation and the sintering operation must be separated, so that the starting material for the sintering operation is in every instance in the metallic state.

All these procedures lead to copper-nickel powders possessing the necessary characteristics in order to obtain therefrom satisfactory copper-nickel sintered plates as carriers of the negative mass of alkaline accumulators, said carriers being free from the disadvantages hereinbefore referred to and affording perfect operation of the negative electrodes.

The structure of the porous sintered plate according to the invention will now be illustrated in the accompanying drawing, in which Figs. 1–4 show the composition of sintered plates made according to the invention, and illustrated at different stages.

The present invention provides a method in which specially fine and pure powders are used for producing plates which are to serve as carriers for the active mass. Fig. 1 shows the beginning of a sintering process in which a fine powder of a copper-nickel alloy is used to make the plate. The individual particles 13 sinter together at those areas where they are in contact and the respective sinter zones are about the conventional size.

Figure 2:
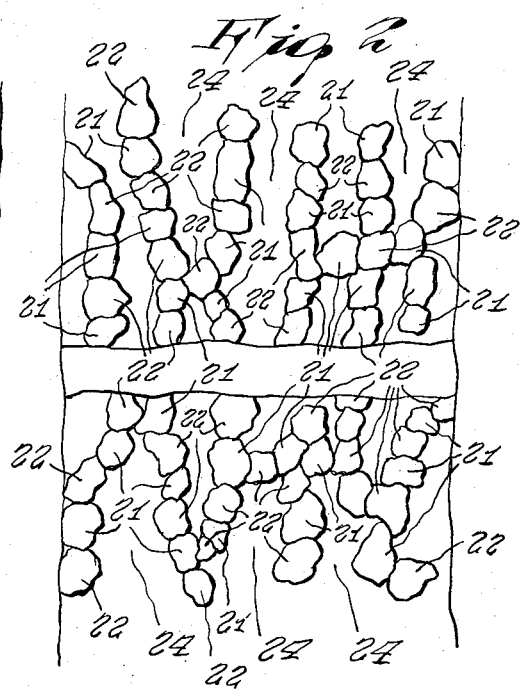

However, if one starts out from a mixed powder of copper and nickel, the sintered plate will have, at the beginning of the sintering, a structure as shown in an enlarged section in Fig. 2. The starting material consists of very finely divided copper powder 21 and finely divided nickel powder 22, which are poured into a mold, where they form a porous structure. Between the particles of powder there is a system of pores 24. This is also to be found in the structure shown in Fig. 1, and designated by 4.

Figure 3:
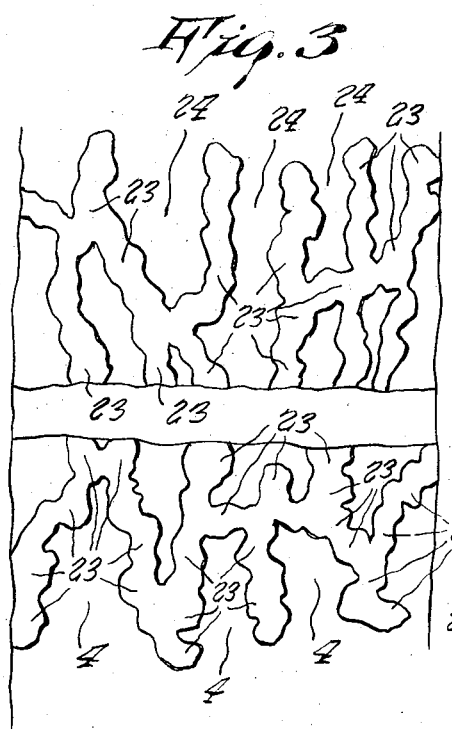

During the sintering process which is carried out in a reducing atmosphere preferably at a temperature of approximately 800–900° C. for 0.5–1.5 hours, there will be formed a sintered structure as it is shown in Fig. 3 where the sintered zones are designated by 23. This sintered structure is interrupted by pores 24.

Figure 4:
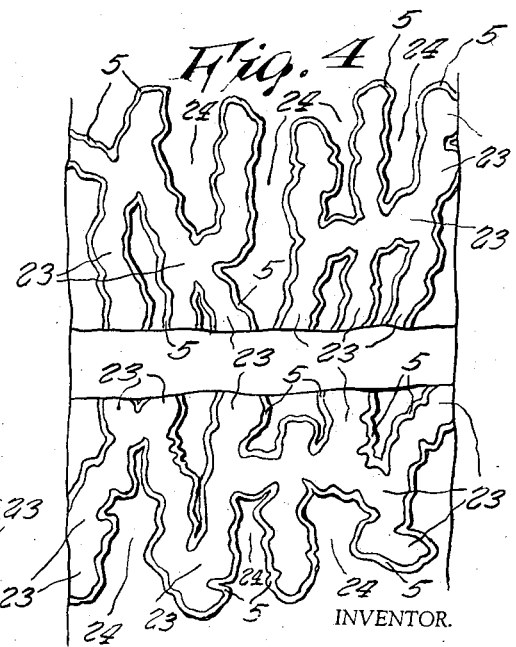

This highly porous sintered structure is then impregnated with active mass in a known manner. The active mass is made to penetrate into the pores in such a manner that the sintered structure is impregnated with a nickel or cadmium salt solution and cathodically polarized in a heated alkali bath. The active mass precipitates in an even layer 5 on the sintered structure 23, as illustrated in Fig. 4.

What I claim is:

1. In a method of producing an electrode plate adapted for use in an alkaline storage battery, the steps of forming a pulverulent mass consisting essentially of between 50% and 70% copper powder having a bulk weight within the range of 0.5 to 1.5 grams per cubic centimeter and approximately 80% of which has a grain diameter of less than 0.06 mm. and between 50% and 30% nickel powder having a bulk weight of up to 1.5 grams per cubic centimeter; and sintering said mass in a reducing atmosphere at a temperature of between about 800° C. and 1000° C. for a period of between about one-half and two hours so as to transform the same into a highly porous plate consisting essentially of a homogeneous alloy of copper and nickel.

2. In a method of producing an electrode plate adapted for use in an alkaline storage battery, the steps of forming a pulverulent mass consisting essentially of between 50% and 70% copper powder having a bulk weight within the range of 0.5 to 1.5 grams per cubic centimeter and approximately 80% of which has a grain diameter of less than 0.06 mm., powder having a bulk weight of up to 1.5 grams per cubic centimeter; sintering said mass in a reducing atmosphere at a temperature of between about 800° C. and 1000° C. for a period of between about one-half and two hours so as to transform the same into a highly porous plate consisting essentially of a homogeneous alloy of copper and nickel; and at least partially filling the pores of the thus formed plate with active mass.

3. In a method of producing an electrode plate adapted for use in an alkaline storage battery, the steps of mixing between 50 and 70 parts by weight of copper powder at least about 80% of the particles of which have a diameter of less than 0.06 mm., said copper powder having a bulk weight of between 0.5 and 1.5 grams per cubic centimeter, with between 50 and 30 parts by weight of a fine nickel powder having a bulk weight of up to 1.5 grams per cubic centimeter so as to form a substantially homogeneous mixture of said copper and nickel powders; and sintering said homogeneous mixture in a reducing atmosphere at a temperature of about 900° C. for a period of between one-half and one and one-half hours so in such manner as to transform the same into a highly porous plate consisting essentially of a homogeneous copper-nickel alloy.

4. In a method of producing an electrode plate adapted for use in an alkaline storage battery, the steps of precipitating from an electrolytic bath a pulverulent mass consisting essentially of between 50% and 70% copper powder having a bulk weight within the range of 0.5 to 1.5 grams per cubic centimeter and approximately 80% of which has a grain diameter of less than 0.06 mm. and between 50% and 30% nickel powder having a bulk weight of up to 1.5 grams per cubic centimeter; and sintering said mass in a reducing atmosphere at a temperature of between about 800° C. and 1000° C. for a period of between about one-half and two hours so as to transform the same into a highly porous plate consisting essentially of a homogeneous alloy of copper and nickel.

5. In a method of producing an electrode plate for use in an alkaline storage battery, the steps of mixing between 50 and 70 parts by weight of copper powder at least about 80% of the particles of which have a diameter of less than 0.06 mm., said copper powder having a bulk weight of between 0.5 and 1.5 grams per cubic centimeter, with between 50 and 30 parts by weight of a carbonyl nickel powder having a bulk weight of up to 1.5 grams per cubic centimeter so as to form a substantially homogeneous mixture of said copper and nickel powders; and sintering said homogeneous mixture in a reducing atmosphere at a temperature of between 800° and 1000° C. for a period of between about one-half and two hours so as to transform the same into a highly porous plate consisting essentially of a homogeneous copper-nickel alloy.

6. In a method of producing an electrode plate adapted for use in an alkaline storage battery, the steps of precipitating by cementation from a solution of copper and nickel salts a pulverulent mass consisting essentially of between 50% and 70% copper powder having a bulk weight within the range of 0.5 to 1.5 grams per cubic centimeter and approximately 80% of which has a grain diameter of less than 0.06 mm. and between 50% and 30% nickel powder having a bulk weight of up to 1.5 grams per cubic centimeter; and sintering said mass in a reducing atmosphere at a temperature of between about 800° C. and 1000° C. for a period of between about one-half and two hours so as to transform the same into a highly porous plate consisting essentially of a homogeneous alloy of copper and nickel.

7. In a method of producing an electrode plate adapted for use in an alkaline storage battery, the steps of reducing a mixture of copper and nickel compounds so as to form a substantially homogeneous mixture consisting essentially of between 50 and 70 parts by weight of copper powder at least about 80% of the particles of which have a diameter of less than 0.06 mm., said copper powder having a bulk weight of between 0.5 and 1.5 grams per cubic centimeter, with between 50 and 30 parts by weight of a fine nickel powder having bulk weight of up to 1.5 grams be cubic centimeter; and sintering said homogeneous mixture in a reducing atmosphere at a temperature of between 800° C. and 1000° C. for a period of between about one-half and two hours so as to transform the same into a highly porous plate consisting essentially of a homogeneous copper-nickel alloy.

8. In a method of producing an electrode plate adapted for use in an alkaline storage battery, the steps of decomposing nickel carbonyl vapor in the presence of copper powder having a bulk weight of between 0.5 and 1.5 grams per cubic centimeter and including about 80% by weight of particles having diameters smaller than 0.06 mm. in such a manner as to form a pulverulent mass consisting essentially of between 50% and 70% copper and between 50% and 30% nickel having a bulk weight of up to 1.5 grams per cubic centimeter; and sintering said mass in a reducing atmosphere at a temperature of between about 800° C. and 1000° C. for a period of between about one-half and two hours so as to transform the same into a highly porous plate consisting essentially of a homogeneous alloy of copper and nickel.

9. In a method of producing an electrode plate adapted for use in an alkaline storage battery, the steps of mixing between 50 and 70 parts by weight of copper powder at least about 80% of the particles of which have a diameter of less than 0.06 mm., said copper powder having a bulk weight of between 0.5 and 1.5 grams per cubic centimeter, with between 50 and 30 parts by weight of a fine nickel powder having a bulk weight of up to 1.5 grams per cubic centimeter so as to form a substantially homogeneous mixture of said copper and nickel powders; and sintering said homogeneous mixture in a reducing atmosphere at a temperature of between about 800 and 900° C. for a period of between ½ and 1½ hours in such a manner as to transform the same into a highly porous plate consisting essentially of a homogeneous copper-nickel alloy.

10. A plate adapted to serve as carrier for the active mass in an electrode of an alkaline storage battery, said plate consisting essentially of a sintered mixture of finely divided copper powder about 80% of the particles of which have diameters smaller than 0.06 mm., said copper powder having a bulk weight of between 0.5 and 1.5 grams per cubic centimeter, and of finely divided nickel powder having a bulk weight of up to 1.5 grams per cubic centimeter in a quantity equal to between 50 and 30% of said mixture, said plate being highly porous and consisting of a substantially homogeneous copper-nickel alloy.

References Cited in the file of this patent

UNITED STATES PATENTS

| | | |
|---|---|---|
| 2,643,276 | Salauze | June 23, 1953 |
| 2,646,457 | Jacquier | July 21, 1953 |
| 2,700,062 | Schlecht et al. | Jan. 18, 1955 |
| 2,794,735 | Schlecht et al. | June 4, 1957 |
| 2,836,641 | Vogt | May 27, 1958 |

OTHER REFERENCES

Vinal: Storage Batteries, John Wiley & Sons, 4th ed., 1957, pages 98 and 100 being pertinent.